(12) United States Patent
Hollmeier et al.

(10) Patent No.: US 11,343,981 B2
(45) Date of Patent: May 31, 2022

(54) GARDENING AND/OR FORESTRY SYSTEM

(71) Applicant: Andreas Stihl AG & Co. KG, Waiblingen (DE)

(72) Inventors: Friedrich Hollmeier, Rudersberg (DE); Harald Mang, Winnenden (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 343 days.

(21) Appl. No.: 16/026,806

(22) Filed: Jul. 3, 2018

(65) Prior Publication Data
US 2019/0008100 A1 Jan. 10, 2019

(30) Foreign Application Priority Data

Jul. 4, 2017 (EP) ..................................... 17179672

(51) Int. Cl.
G01S 13/75 (2006.01)
A01G 23/099 (2006.01)
B27B 17/00 (2006.01)
G01B 15/00 (2006.01)

(52) U.S. Cl.
CPC ........ *A01G 23/099* (2013.01); *B27B 17/0025* (2013.01); *G01B 15/00* (2013.01)

(58) Field of Classification Search
CPC ... A01G 23/099; B27B 17/0025; G01B 15/00
See application file for complete search history.

(56) References Cited

U.S. PATENT DOCUMENTS

| | | | | |
|---|---|---|---|---|
| 2007/0259690 | A1* | 11/2007 | Julian | H04L 67/24 455/557 |
| 2011/0128162 | A1* | 6/2011 | Klepsvik | G01S 17/10 340/985 |
| 2015/0121712 | A1 | 5/2015 | Ott | |
| 2015/0360305 | A1 | 12/2015 | Willgert | |
| 2017/0135061 | A1* | 5/2017 | Park | H04W 4/02 |
| 2017/0364162 | A1* | 12/2017 | Fujimaki | G06F 3/011 |

FOREIGN PATENT DOCUMENTS

| | | | |
|---|---|---|---|
| DE | 42 15 733 A1 | 11/1993 | |
| DE | 42 32 412 A1 | 3/1994 | |
| DE | 4232412 A1 * | 3/1994 | ........... G01B 5/0035 |
| DE | 10 2008 027 185 A1 | 12/2009 | |
| DE | 102008027185 A1 * | 12/2009 | ............... G01S 5/10 |
| DE | 10 2011 100 016 A1 | 10/2012 | |
| DE | 10 2014 006 583 A1 | 11/2015 | |
| EP | 0 103 216 A1 | 3/1984 | |

\* cited by examiner

*Primary Examiner* — Timothy A Brainard
(74) *Attorney, Agent, or Firm* — Crowell & Moring LLP

(57) ABSTRACT

A gardening and/or forestry system includes a distance measuring system, including a first distance part and a second distance part, wherein the second distance part is configured to be carried on a body of a gardener and/or forestry worker. The distance measuring system is configured to exchange a measuring signal between the first distance part and the second distance part and to measure a distance between the first distance part and the second distance part based on the exchanged measuring signal. An output device is configured to output information based on the measured distance to the gardener and/or forestry worker.

12 Claims, 1 Drawing Sheet

GARDENING AND/OR FORESTRY SYSTEM

CROSS REFERENCE TO RELATED APPLICATION

This application claims priority under 35 U.S.C. § 119 from European Patent Application No. 17179672.5, filed Jul. 4, 2017, the entire disclosure of which is herein expressly incorporated by reference.

BACKGROUND AND SUMMARY OF THE INVENTION

The invention relates to a gardening and/or forestry system.

Gardening and/or forestry systems are known.

The invention addresses the problem of providing a gardening and/or forestry system that has improved properties, in particular is user-friendly and increases measuring accuracy.

The invention solves this problem by providing a gardening and/or forestry system in accordance with claimed embodiments of this invention. Advantageous developments and/or refinements of the invention are described and claimed herein.

The gardening and/or forestry system according to the invention comprises a distance measuring system. The distance measuring system includes a first distance part and a second distance part. The second distance part is configured to be carried on a body of a gardener and/or a forestry worker. The distance measuring system is configured to exchange, in particular exchange automatically, a measuring signal between the first distance part and the second distance part, in particular carried on the body, and to measure, in particular measure automatically, a distance between the first distance part and the second distance part, in particular carried on the body, based on the exchanged measuring signal. The gardening and/or forestry system according to the invention also comprises an output device, in particular an electrical output device. The output device is configured to output, in particular output automatically, information based on the measured distance to the gardener and/or forestry worker.

The gardening and/or forestry system enables the gardener and/or forestry worker to measure distances, in particular lengths, in particular during the gardening and/or forestry work. The gardening and/or forestry work may comprise or be cutting up a tree, in particular a felled and/or lying tree, or a trunk of the tree into a number of pieces. The distances may have been preselected in advance by means of a primary conversion of the tree or its tree trunk. In particular, the gardening and/or forestry system may comprise a preselecting device, which may be configured to preselect the distance.

In particular, the second distance part may be configured to be carried on the body during or when exchanging the measuring signal or measuring. In other words: the distance measuring system or its second distance part may be configured to exchange the measuring signal or to measure while or when it is being carried on the body.

The carrying of the second distance part on the body of the gardener and/or forestry worker allows the second distance part to be isolated and/or protected from rough ambient conditions, in particular caused by a motor-driven gardening and/or forestry apparatus. This can allow increased measuring accuracy of the distance measurement. Furthermore, being carried on the body of the gardener and/or forestry worker allows the second distance part always to be at the location of the tree at which the gardener and/or forestry worker is located. Generally, certain locations at which the gardener and/or forestry worker is to carry out an action will be of great interest. In particular, carrying on the body may comprise or be attachment or fastening to the body.

The information may comprise or be the measured distance or a value or absolute amount of the measured distance. In addition or alternatively, the information may comprise or be reaching of the distance, which may in particular be preselected.

In particular, the distance measuring system and the output device may be configured to interact with one another. The second distance part may be different from the first distance part. The measuring signal may comprise or be an optical signal or an acoustic signal.

In a development of the invention, the first distance part is configured to be attached to a gardening and/or forestry apparatus, in particular a forest maintenance apparatus. The gardener and/or forestry worker will generally take the gardening and/or forestry apparatus along with him, in particular for the gardening and/or forestry work. By attaching the first distance part to the gardening and/or forestry apparatus, the first distance part can be taken along without requiring any further thought. In addition or alternatively, the attachment of the first distance part to the gardening and/or forestry apparatus may allow a more stable and/or better measuring position of the first distance part. In particular, the first distance part may be configured to be attached to the gardening and/or forestry apparatus by a material-bonding, interlocking or frictionally engaging connection.

In a development of the invention, the gardening and/or forestry system comprises the gardening and/or forestry apparatus. The first distance part is attached to the gardening and/or forestry apparatus. In particular, the gardening and/or forestry apparatus may have a maximum mass of 50 kilograms (kg), in particular of 20 kg, in particular of 10 kg. The gardening and/or forestry apparatus may be configured as a hand-carried gardening and/or forestry apparatus.

In a development of the invention, the gardening and/or forestry apparatus includes or is an axe and/or a pickaroon and/or a peavey and/or a wedge and/or a saw and/or a driving energy storage device. The gardener and/or forestry worker will generally carry along the gardening and/or forestry apparatuses developed in such a way with him, in particular for felling and/or cutting up a tree or its tree trunk. At least one of the gardening and/or forestry apparatuses developed in such a way may be motor-driven. In particular, the saw may be configured as a motor-driven saw, in particular as a chainsaw. In addition or alternatively, the gardening and/or forestry system may comprise a further motor-driven gardening and/or forestry apparatus. The motor-driven gardening and/or forestry apparatus and/or the further motor-driven gardening and/or forestry apparatus may in each case include an internal combustion engine or an electric motor. The driving energy storage device may be configured to supply driving energy to the motor-driven gardening and/or forestry apparatus and/or the further motor-driven gardening and/or forestry apparatus. In particular, the driving energy storage device may comprise or be a rechargeable battery, a battery, a fuel canister and/or an oil canister.

In a development of the invention, the gardening and/or forestry apparatus includes an extendable telescopic device. The first distance part is attached to the telescopic device.

The telescopic device may allow a better measuring position of the first distance part. In particular, a difference in height between the first distance part and the second distance part may be reduced or equalized by the telescopic device.

In a development of the invention, the second distance part may be configured to at least partially clasp or enclose an extremity of the body of the gardener and/or forestry worker. The extremity may be an arm, a finger, a leg or a head. The at least partial clasping of the extremity advantageously allows the second distance part to be carried by the gardener and/or forestry worker without being actively gripped or grasped. In particular, carrying on the arm may be advantageous, in particular if the arm will be aligned as an extension of a separating cut to be carried out for cutting up when carrying it out.

In a development of the invention, the gardening and/or forestry system comprises a protective helmet and/or a face shield and/or ear protection and/or safety goggles and/or a protective glove and/or a smartwatch and/or an armband and/or a wristband and/or a bracelet, whereon the second distance part is disposed. The gardener and/or forestry worker will generally wear at least one of the previously listed items, in particular for the gardening and/or forestry work. By wearing the item, the gardener and/or forestry worker can advantageously at the same time take the second distance part along with him.

In a development of the invention, the gardening and/or forestry system comprises a protective helmet and/or a face shield and/or ear protection and/or safety goggles and/or a protective glove and/or a smartwatch and/or an armband and/or a wristband and/or a bracelet, whereon the output device is disposed. By wearing the item, the gardener and/or forestry worker can advantageously at the same time take the output device along with him.

In a development of the invention, the output device is or includes a display and/or a sound generator and/or a vibration device. In particular, the display may be configured to display the at least one item of information in a field of view of the gardener and/or forestry worker, in particular before a location at which the gardener and/or forestry worker is to carry out an action, and/or to project or superimpose such information into the field of view. The display may project a marking on the object/location/tree/tree trunk to be worked. The display may be referred to as a head-up display. This may be referred to as virtual reality and/or as augmented reality. In particular, the display may be configured to display the at least one item of information on a visor of the protective helmet, the face shield and/or ear protection and/or safety goggles, if present, or to project it into them. The display may be referred to as a head-mounted display. The sound generator may comprise or be a loudspeaker.

In a development of the invention, the distance measuring system is configured to measure the distance in a contactless manner. This can allow user-friendly measuring.

In a development of the invention, the measuring signal includes or is a radio signal. The radio signal may comprise or be electromagnetic waves or vibrations in the radio frequency range. The radio signal may comprise or be an ultra-wideband signal (UWB signal).

In a development of the invention, one of the two distance parts is configured to send and receive the measuring signal. Another of the two distance parts is configured to reflect the measuring signal. This can allow the other of the two distance parts to be kept relatively simple in its construction, and consequently relatively inexpensive. In particular, the other of the two distance parts may comprise or be a transponder, in particular a passive transponder. The one of the two distance parts may comprise an antenna, in particular a radio antenna, for sending and receiving the measuring signal. The one of the two distance parts may be referred to as a transmitter and receiver.

In a development of the invention, one of the two distance parts is configured to send the measuring signal. Another of the two distance parts is configured to receive the measuring signal. In particular, the one of the two distance parts may comprise an antenna, in particular a radio antenna, for sending the measuring signal. The one of the two distance parts may be referred to as a transmitter. The other of the two distance parts may comprise an antenna, in particular a radio antenna, for receiving the measuring signal. The other of the two distance parts may be referred to as a receiver.

In a development of the invention, the distance measuring system is configured to measure the distance between the first distance part and the second distance part based on a propagation delay of the measuring signal.

In a development of the invention, the gardening and/or forestry system is configured to define a reference distance and to take the defined reference distance into account in the information. This can allow reference setting, in particular zeroing, of the distance measuring system. Defining the reference distance allows the information to comprise a distance, in particular a length, and/or reaching of the distance, in particular the preselected distance, between a reference point and the second distance part. The reference point may be located away from the first distance part by the value of the reference distance. In particular, the reference point may be in the region of a start of a tree or of its tree trunk or in the region of a separating cut. In particular, the gardening and/or forestry system or its distance measuring system may be configured to subtract the reference distance from the measured distance. In particular, the gardening and/or forestry system or its distance measuring system may comprise a reference definition device, in particular a user-actuable reference definition device, which may be configured for defining the reference distance and/or for defining the reference point.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
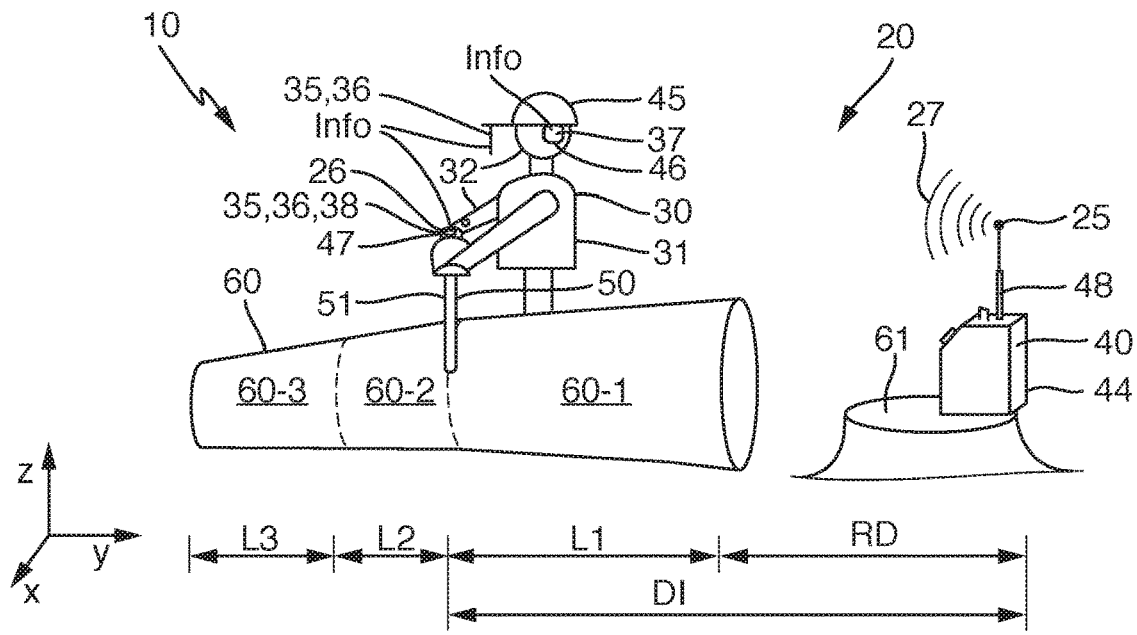
FIG. 1 shows a perspective view of a gardening and/or forestry system according to an embodiment of the invention.

FIG. 1 shows a gardening and/or forestry system 10. The gardening and/or forestry system 10 comprises a distance measuring system 20. The distance measuring system 20 includes a first distance part 25 and a second distance part 26. The second distance part 26 is configured to be carried on a body 30 of a gardener and/or forestry worker 31. The distance measuring system 20 is configured to exchange a measuring signal 27 between the first distance part 25 and the second distance part 26 and to measure a distance DI between the first distance part 25 and the second distance part 26 based on the exchanged measuring signal 27. The gardening and/or forestry system 10 also comprises an output device 35. The output device 35 is configured to output information Info based on the measured distance DI to the gardener and/or forestry worker 31.

The first distance part 25 is configured to be attached to a gardening and/or forestry apparatus 40. In the exemplary embodiment shown, the gardening and/or forestry system 10 comprises the gardening and/or forestry apparatus 40, wherein the first distance part 25 is attached to the gardening and/or forestry apparatus 40.

In detail, the gardening and/or forestry apparatus 40 includes a driving energy storage device 44 in the form of a fuel canister. The gardening and/or forestry system 10 also comprises a further gardening and/or forestry apparatus, in particular a motor-driven gardening and/or forestry apparatus 51. In the exemplary embodiment shown, the further motor-driven gardening and/or forestry apparatus 51 is configured as a saw, in particular as a motor-driven chainsaw. The driving energy storage device 44 is configured to supply driving energy to the further motor-driven gardening and/or forestry apparatus 51, in particular to refill a fuel tank of the further motor-driven gardening and/or forestry apparatus with fuel.

What is more, the gardening and/or forestry apparatus 40 includes an extendable telescopic device 48. The first distance part 25 is attached to the telescopic device 48.

Furthermore, the second distance part 26 is configured to at least partially clasp an extremity 32 of the body 30 of the gardener and/or forestry worker 31. In the exemplary embodiment shown, the second distance part 26 at least partially clasps a right arm, in particular a lower arm, of the gardener and/or forestry worker 31.

In detail, the gardening and/or forestry system 10 comprises a smartwatch 47. The second distance part 26 is disposed on the smartwatch 47. The gardener and/or forestry worker 31 wears the smartwatch on the right arm 32, as described above.

Moreover, the output device 35 includes at least one display 36, a sound generator 37 and a vibration device 38. In the exemplary embodiment shown, the output device 35 comprises two displays 36. In alternative exemplary embodiments, it may be sufficient if the output device may include either the display or the sound generator or the vibration device.

The gardening and/or forestry system 10 also comprises a protective helmet 45 and a face shield and/or ear protection 46. The gardener and/or forestry worker 31 wears the protective helmet 45 and the face shield and/or ear protection 46 on his head 32.

In the exemplary embodiment shown, one of the displays 36 is disposed on the protective helmet 45, in particular is integrated in the protective helmet 45. What is more, the sound generator 37 is disposed on the face shield and/or ear protection 46, in particular is integrated in the face shield and/or ear protection 46. Furthermore, the vibration device 38 and one other of the displays 36 are disposed on the smartwatch 47, in particular are integrated in the smartwatch 47.

In alternative exemplary embodiments, the gardening and/or forestry system may comprise either the smartwatch or the protective helmet or the face shield and/or ear protection, whereon the second distance part and/or the output device may be disposed. Furthermore, in alternative exemplary embodiments, the gardening and/or forestry system may comprise safety goggles and/or a protective glove and/or an armband and/or a wristband and/or a bracelet, whereon the second distance part and/or the output device may be disposed.

In the exemplary embodiment shown, the gardener and/or forestry worker 31 is to cut up a felled tree trunk 60 into three pieces 60-1, 60-2, 60-3, in particular by separating cuts as indicated in FIG. 1 by dashed lines. After cutting up, each of the three pieces 60-1, 60-2, 60-3 is intended to be of a length individual to the piece L1, L2, L3 that is determined in advance by means of a primary conversion of the tree trunk 60. The lengths L1, L2, L3 are known to the gardening and/or forestry system 10 and/or have been preselected.

The gardener and/or forestry worker 31 has placed the driving energy storage device 44 onto a tree stump 61 in such a way that the driving energy storage device 44 and the tree trunk 60 are in a straight line. In other words: the gardening and/or forestry apparatus 40 is disposed with the first distance part 25 as an extension of the felled tree trunk 60. The tree trunk 60 has previously been separated from the tree stump 61 by felling. The extendable telescopic device 48 has been extended, and so the first distance part 25 is at the same height as the second distance part 26 in FIG. 1, in particular when the gardener and/or forestry worker assumes a position for cutting up the tree trunk 60.

In particular, when the gardener and/or forestry worker 31 assumes the position for cutting up the tree trunk 60 by means of the saw 51, then in this position his right arm 32 is located with the second distance part 26 in a separating plane or cutting plane of the saw 51. The measured distance DI therefore corresponds to a distance between the first distance part 25 and the separating plane of the power saw 51 or the distance between the first distance part 25 and a separating cut to be carried out.

The distance measuring system 20 is configured to measure the distance DI in a contactless manner. In detail, the measuring signal 27 is a radio signal.

Furthermore, the first distance part 25 is configured to send the measuring signal 27. The second distance part 26 is configured to receive the measuring signal 27. In alternative exemplary embodiments, the second distance part may be configured to send the measuring signal, and the first distance part may be configured to receive the measuring signal. In detail, the first distance part 25 and/or the second distance part 26 comprise(s) in each case an electrical energy source, in particular a rechargeable battery or a battery, which in each case supplies the associated distance part with electrical energy for sending and/or receiving.

In the exemplary embodiment shown, the first distance part 25 sends the measuring signal 27. The second distance part 26 receives the sent measuring signal 27. Once the second distance part 26 has received the measuring signal 27, the distance measuring system 20 determines a propagation delay of the measuring signal 27, in particular from the first distance part 25 to the second distance part 26. Based on the propagation delay and a propagation rate of the measuring signal 27 known to the second distance part 26, the distance measuring system 20 determines the distance DI between the first distance part 25 and the second distance part 26. The distance measuring system 20 determines the distance DI continuously, in particular repeatedly in one second.

What is more, the gardening and/or forestry system 10 or its distance measuring system 20 is configured to define a reference distance RD and to take the defined reference distance RD into account in the information Info. In detail, the gardening and/or forestry system 10 or its distance measuring system 20 comprises a user-actuable reference definition device (not shown) in the form of a button on the smartwatch 47, wherein the reference definition device is configured to define the reference distance RD. To define the reference distance RD, the gardener and/or forestry worker 31 holds the smartwatch 47 with the second distance part 26 at a start of the tree trunk 60 on the right in FIG. 1 and actuates the reference definition device.

In alternative exemplary embodiments, the gardening and/or forestry system or its distance measuring system may be additionally or alternatively configured to detect an actuation of the motor-driven gardening and/or forestry apparatus and to define the reference distance in dependence on the detected actuation. With respect to the exemplary embodiment shown, this could mean that, to define the reference distance RD, the gardener and/or forestry worker 31 holds the smartwatch 47 with the second distance part 26 at the start on the right of the tree trunk 60 and actuates the saw 51.

Consequently, the defined reference distance RD corresponds to the distance between the start on the right of the tree trunk 60 and the first distance part 25.

The gardening and/or forestry system 10 or its distance measuring system 20 is also configured to store the reference distance RD. What is more, the gardening and/or forestry system 10 or its distance measuring system 20 is configured to subtract the reference distance RD from the measured distance DI.

After defining the reference distance RD, the gardener and/or forestry worker 31 moves with the second distance part 26 along the tree trunk 60 to the left in FIG. 1. When the measured distance DI corresponds to the reference distance RD plus the prescribed length L1, the output device 35 outputs the information Info, in particular the reaching of the length L1. The information Info comprises the value of the length L1 and the reaching of the length L1. In addition, the information may comprise an instruction to perform an action, in particular to cut through the tree trunk at this location.

In the exemplary embodiment shown, the information Info is output acoustically to the gardener and/or forestry worker 31 by a voice output and/or a tone by the sound generator 37. The information Info is also output haptically by vibrating of the vibration device 38. What is more, the information Info is output optically by a display on the other display 36 of the smartwatch 47. Furthermore, the information Info is output optically by a display on the one display 36 of the protective helmet 45. In detail, the protective helmet 45 has a visor. The display 36 is configured to display the information Info on the visor of the protective helmet 45 in a field of view of the gardener and/or forestry worker 31, in particular at a suitable location before the tree trunk 60, or to project it into this field of view. In alternative exemplary embodiments, it may be sufficient if the information can be output either optically or acoustically or haptically.

In response to the information Info, the gardener and/or forestry worker 31 cuts through the tree trunk 60 with the saw 51. In detail, the worker cuts off the piece 60-1.

Furthermore, the gardener and/or forestry worker 31 may define a new reference distance (not shown) at the new start of the tree trunk 60 or the location of the separating cut, measure the length L2 and cut up the tree trunk 60 after the length L2 into the pieces 60-2, 60-3.

Figure 2:
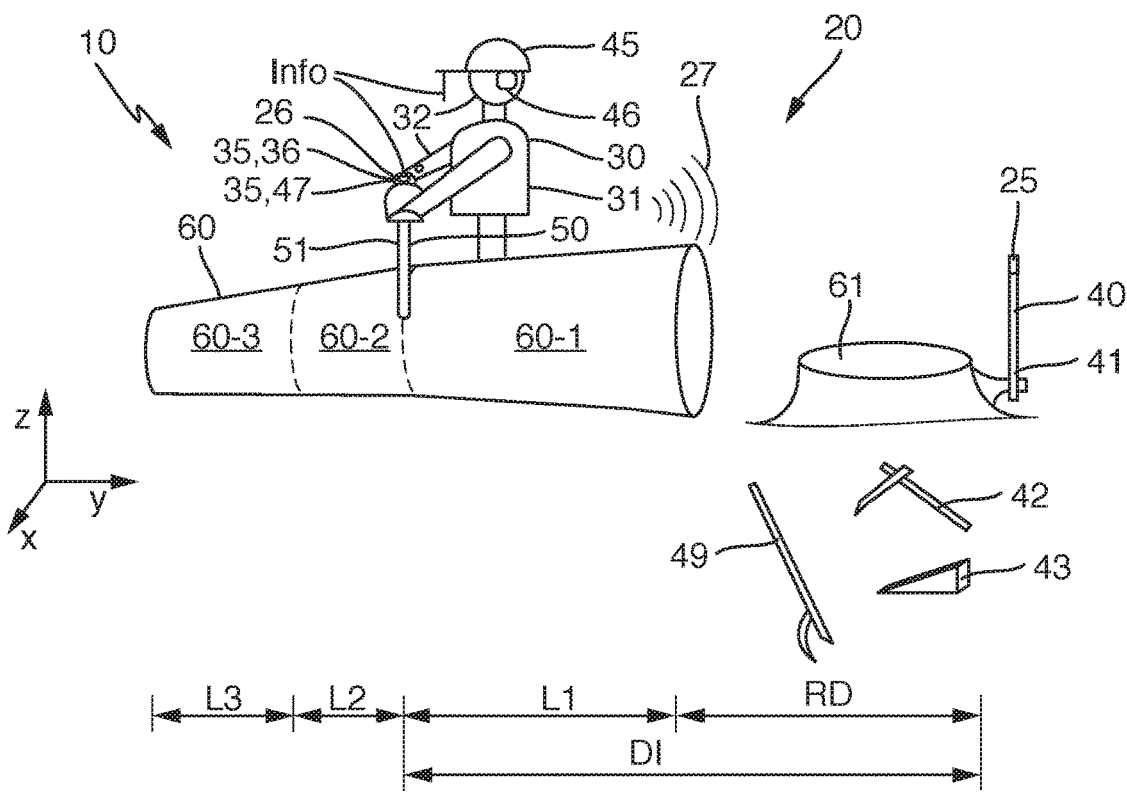
FIG. 2 shows a further perspective view of a further gardening and/or forestry system according to an embodiment of the invention.

FIG. 2 shows a further exemplary embodiment of a gardening and/or forestry system according to the invention, for better understanding the same designations being used for identical and functionally equivalent elements and it being possible to this extent also to refer to the above statements relating to the exemplary embodiment of FIG. 1, and so essentially only the differences that exist are discussed below.

In the exemplary embodiment of FIG. 2, the gardening and/or forestry system 10 comprises a gardening and/or forestry apparatus 40 in the form of an axe 41, to which the first distance part 25 is attached.

In detail, the axe 41 has been buried into the tree stump 61. The axe 41 has not been buried into the felled tree trunk 60, because of the risk that the tree trunk 60 or a cut-off piece, in particular the piece 60-1, may move, in particular roll away or slip away, during the cutting up or after the cutting up. In this case, the measuring position of the first distance part 25 would change. This would make it necessary for the first distance part 25 to be disposed once again in a meaningful measuring position. The burying of the axe 41 into the tree stump 61 can avoid these disadvantages.

The second distance part 26 is configured to send and receive the measuring signal 27. The first distance part 25 is configured to reflect the measuring signal. In detail, the second distance part 26 emits the measuring signal 27, the sent measuring signal 27 is reflected by the first distance part 25 and the reflected measuring signal 27 is received by the second distance part 26. In alternative exemplary embodiments, the first distance part may be configured to send and receive the measuring signal, and the second distance part may be configured to reflect the measuring signal. Based on the propagation delay of the measuring signal 27, the distance measuring system 20 determines the distance DI between the first distance part 25 and the second distance part 26. The fact that the measuring signal 27 is reflected by the first distance part 25 means that the propagation delay of the measuring signal 27 is doubled in comparison with the exemplary embodiment of FIG. 1.

In the previously described exemplary embodiments, the gardening and/or forestry apparatus 40 includes the driving energy storage device 44 or the axe 41, whereon the first distance part 25 is disposed. In addition or alternatively, the gardening and/or forestry apparatus 40 may include a pickaroon 42, a peavey 49 and/or a wedge 43, as shown in FIG. 2, to which the first distance part may be attached. In addition or alternatively, the first distance part may be attached to the saw.

As the exemplary embodiments shown and explained above make clear, the invention provides a gardening and/or forestry system that has improved properties, in particular is user-friendly and increases measuring accuracy.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A gardening and/or forestry system for use with a gardening and/or forestry apparatus, comprising:
   a distance measuring system, including a first distance part and a second distance part,
   wherein the second distance part is configured to be carried on a body of a gardener and/or forestry worker and not on the gardening and/or forestry apparatus,
   wherein the second distance part is configured to at least partially clasp an extremity of the body of the gardener and/or forestry worker and/or wherein the gardening and/or forestry system further comprises a protective helmet, a face shield, ear protection, safety goggles, a protective glove, a smartwatch, an armband, a wristband and/or a bracelet, whereon the second distance part is disposed, wherein the distance measuring system is configured to exchange a measuring signal between the first distance part and the second distance part and to measure a distance between the first distance part and the second distance part based on the exchanged measuring signal, and an output device configured to output information based on the measured distance to the gardener and/or forestry worker, wherein the first distance part is configured to be attached to the gardening and/or forestry apparatus.

2. The gardening and/or forestry system according to claim 1, further comprising:

the gardening and/or forestry apparatus, wherein the first distance part is attached to the gardening and/or forestry apparatus.

3. The gardening and/or forestry system according to claim 2, wherein the gardening and/or forestry apparatus comprises one or more of:

an axe, a pickaroon, a peavey, a wedge, a saw, or a driving energy storage device.

4. The gardening and/or forestry system according to claim 2, wherein the gardening and/or forestry apparatus comprises an extendable telescopic device, wherein the first distance part is attached to the telescopic device.

5. The gardening and/or forestry system according to claim 1, further comprising:

the protective helmet, the face shield, the ear protection, the safety goggles, the protective glove, the smartwatch, the armband, the wristband, and/or the bracelet, whereon the output device is disposed.

6. The gardening and/or forestry system according to claim 1, wherein the output device includes one or more of: a display, a sound generator, or a vibration device.

7. The gardening and/or forestry system according to claim 1, wherein the distance measuring system is configured to measure the distance in a contactless manner.

8. The gardening and/or forestry system according to claim 1, wherein the measuring signal includes a radio signal.

9. The gardening and/or forestry system according to claim 1, wherein one of the two distance parts is configured to send and to receive the measuring signal, and the other one of the two distance parts is configured to reflect the measuring signal.

10. The gardening and/or forestry system according to claim 1, wherein one of the two distance parts is configured to send the measuring signal, and the other one of the two distance parts is configured to receive the measuring signal.

11. The gardening and/or forestry system according to claim 1, wherein the distance measuring system is configured to measure the distance between the first distance part and the second distance part based on a propagation delay of the measuring signal.

12. The gardening and/or forestry system according to claim 1, wherein the gardening and/or forestry system is configured to define a reference distance and to take the defined reference distance into account in the information.

* * * * *